United States Patent
Tyler (10) Patent No.: US 8,936,038 B1
(45) Date of Patent: Jan. 20, 2015

(54) ELECTROMAGNETIC WATER METER HOLDER APPARATUS AND METHOD

(71) Applicant: Dave Tyler, Stuart, FL (US)

(72) Inventor: Dave Tyler, Stuart, FL (US)

(*) Notice: Subject to any disclaimer, the term of this patent is extended or adjusted under 35 U.S.C. 154(b) by 239 days.

(21) Appl. No.: 13/686,616

(22) Filed: Nov. 27, 2012

(51) Int. Cl.
   *F16K 51/00* (2006.01)
   *G01F 15/18* (2006.01)
   *G01F 1/56* (2006.01)
   *F16L 55/18* (2006.01)
   *F16M 13/02* (2006.01)

(52) U.S. Cl.
   CPC ............... *F16L 55/18* (2013.01); *F16M 13/02* (2013.01)
   USPC ........................... 137/315.06; 73/198; 73/201

(58) Field of Classification Search
   CPC ............ F16L 55/18; F16M 13/02; G01F 1/58
   USPC ................................ 137/315.06; 73/201, 198
   See application file for complete search history.

(56) References Cited

U.S. PATENT DOCUMENTS

| | | | |
|---|---|---|---|
| 365,555 A | 6/1887 | Tolman | |
| 2,155,380 A | 4/1939 | Bean | |
| 3,332,653 A | 7/1967 | Hoelzel | |
| 3,612,649 A | 10/1971 | Pusey | |
| 3,691,877 A | 9/1972 | Harris | |
| 4,334,443 A | 6/1982 | Pearson | |
| 4,603,507 A | 8/1986 | Nelson | |
| 4,631,969 A * | 12/1986 | Schmoock | 73/861.12 |
| 5,370,345 A * | 12/1994 | Condon | 248/65 |
| 5,586,413 A | 12/1996 | Sharon | |
| 6,298,734 B1 * | 10/2001 | Storer et al. | 73/861.22 |
| 7,024,816 B1 * | 4/2006 | Marks et al. | 47/39 |

* cited by examiner

*Primary Examiner* — John Rivell
*Assistant Examiner* — Kevin Barss
(74) *Attorney, Agent, or Firm* — H. John Rizvi; Gold & Rizvi P.A.

(57) ABSTRACT

An electromagnetic water meter holder apparatus for holding and stabilizing an electromagnetic water meter in a water meter box. A cylindrical rod, large circular tube and arched tab are used, and are optimally sized to hold and stabilize electromagnetic water meters. The method includes positioning an electromagnetic water meter into a water meter box for installation. Aligning and optimizing the electromagnetic water meter pipe nozzles of the electromagnetic water meter up with existing pipe for water flow management. Securing of the electromagnetic water meter in place by moving the cylindrical rod of the electromagnetic water meter holder apparatus, thereby preventing rotation or movement of the electromagnetic water meter; and connecting the existing pipe for water flow in and water flow out of the water meter box to the electromagnetic water meter by securing the existing pipe to the electromagnetic water meter pipe nozzles with connectors.

18 Claims, 6 Drawing Sheets

ELECTROMAGNETIC WATER METER HOLDER APPARATUS AND METHOD

FIELD OF THE INVENTION

The present disclosure relates generally to holding and stabilizing devices, and more particularly, to an electromagnetic water meter holder apparatus and method of use.

BACKGROUND OF THE INVENTION

The present invention provides an electromagnetic water meter holder apparatus. It appears that a water meter holder that holds and stabilizes an electromagnetic water meter, and prevents it from rotating thereby allowing installation connections to be made to it or removed from it, is not described by any prior art device.

Accordingly, there is an established need for a water meter holder which holds and stabilizes an electromagnetic water meter holder in place, thereby allowing for installation connections to be made to it or removed from it.

SUMMARY OF THE INVENTION

The basic inventive concept provides an electromagnetic water meter holder apparatus and method, which holds and stabilizes an electromagnetic water meter in place, thereby allowing for installation connections to be made to it or removed from it.

In one general aspect of the present invention, an electromagnetic water meter holder apparatus for holding and stabilizing an electromagnetic water meter in a water meter box for installation or removal, includes a cylindrical rod having a top end, a center and a bottom end; and a large circular tube mounted on the cylindrical rod between the center and the bottom end; and an arched tab mounted on the cylindrical rod between the large circular tube and the bottom end.

In another aspect of the present invention, an electromagnetic water meter holder method includes positioning an electromagnetic water meter having electromagnetic water meter pipe nozzles into a water meter box for installation; and aligning the electromagnetic water meter pipe nozzles of the electromagnetic water meter up with existing pipe for water flow in and water flow out of the water meter box; and positioning an electromagnetic water meter holder apparatus onto and around the electromagnetic water meter, the electromagnetic water meter holder apparatus having a cylindrical rod having a top end, a center and a bottom end; and a large circular tube mounted on the cylindrical rod between the center and the bottom end; and an arched tab mounted on the cylindrical rod between the large circular tube and the bottom end; and optimizing the positioning of the electromagnetic water meter holder apparatus and thereby the holding and securing of the electromagnetic water meter in place by moving the cylindrical rod of the electromagnetic water meter holder apparatus, thereby moving the large circular tube on top of and around the electromagnetic water meter and the arched tab around the electromagnetic water meter to prevent rotation or movement of the electromagnetic water meter; and connecting the existing pipe for water flow in and water flow out of the water meter box to the electromagnetic water meter by securing the existing pipe to the electromagnetic water meter pipe nozzles with connectors, while continuing to optimally position the water meter holder apparatus by moving the cylindrical rod.

In a further aspect of the present invention, an electromagnetic water meter holder method includes opening a water meter box for the removal of an electromagnetic water meter, the electromagnetic water meter having electromagnetic water meter pipe nozzles connected to existing pipe via connectors for water flow in and water flow out of the water meter box; and positioning an electromagnetic water meter holder apparatus onto and around the electromagnetic water meter, the electromagnetic water meter holder apparatus having a cylindrical rod having a top end, a center and a bottom end; and a large circular tube mounted on the cylindrical rod between the center and the bottom end; and an arched tab mounted on the cylindrical rod between the large circular tube and the bottom end; and optimizing the positioning of the electromagnetic water meter holder apparatus and thereby the holding and securing of the electromagnetic water meter in place by moving the cylindrical rod of the electromagnetic water meter holder apparatus, thereby moving the large circular tube on top of and around the electromagnetic water meter and the arched tab around the electromagnetic water meter to prevent rotation or movement of the electromagnetic water meter; and disconnecting the existing pipe for water flow in and water flow out of the water meter box to the electromagnetic water meter by removing the connectors from the existing pipe to the electromagnetic water meter pipe nozzles of the electromagnetic water meter, while continuing to optimally position the water meter holder apparatus by moving the cylindrical rod.

In yet a further object of the present invention, the electromagnetic water meter holder apparatus includes a cylindrical rod, wherein the cylindrical rod is steel.

In yet a further object of the present invention, the electromagnetic water meter holder apparatus includes a large circular tube, wherein the large circular tube is steel.

In yet a further object of the present invention, the electromagnetic water meter holder apparatus includes an arched tab, wherein the arched tab is steel.

In yet a further object of the present invention, the electromagnetic water meter holder apparatus includes a large circular tube, wherein the large circular tube is mounted on the cylindrical rod by steel rivets.

In yet a further object of the present invention, the electromagnetic water meter holder apparatus includes an arched tab, wherein the arched tab is mounted on the cylindrical rod by welding.

In yet a further object of the present invention, the electromagnetic water meter holder apparatus is sized to hold and stabilize an electromagnetic water meter in a water meter box of 11 inches by 18 inches in dimension.

In yet a further object of the present invention, the electromagnetic water meter holder apparatus is sized to hold and stabilize an electromagnetic water meter in a water meter box of 13 inches by 18 inches in dimension.

In yet a further object of the present invention, the electromagnetic water meter holder apparatus is sized in dimensions to hold and stabilize a Sensus Iperl© Electromagnetic Water Meter.

These and other aspects, features and advantages of the present invention will become more readily apparent from the attached drawing and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
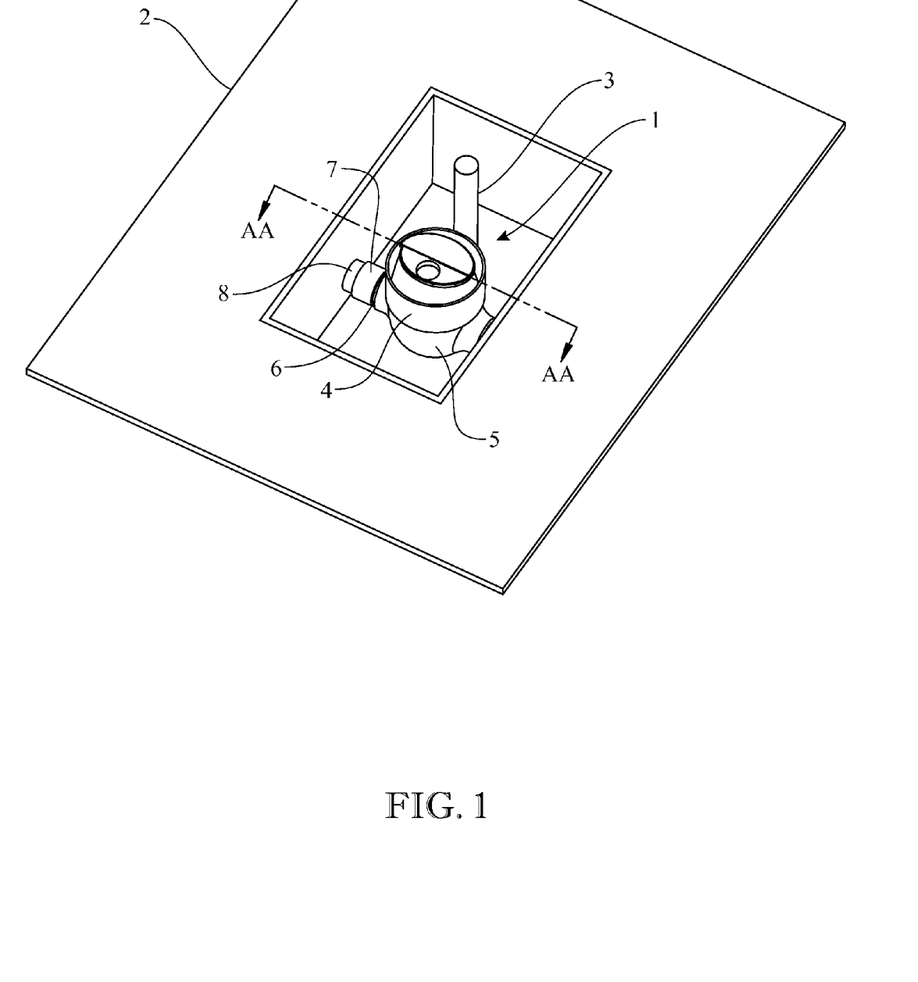
FIG. 1 is an isometric view of the installed Electromagnetic Water Meter in the water meter box.

Referring briefly to FIG. 1, the installed Electromagnetic Water Meter 5 in the water meter box 2 is illustrated. The Electromagnetic Water Measurement System (EMWMS) 5 comprises a new type of water meter 5 that is being installed into existing water meter boxes 2. The Electromagnetic Water Meter 5 measures the amount of water that flows through the system using electromagnetic flow technology. However, as differentiated from previous water meters in use, the Electromagnetic Water Meter 5 does not provide an area to grasp by wrench to tighten the meter during installation and/or removal. The Electromagnetic Water Meter Holder apparatus 1 of the present invention provides a solution to this as it eliminates water meter 5 movements within the water meter box 2. The Electromagnetic Water Meter Holder apparatus 1 is a simple tool with no moving parts, and it slips over the Electromagnetic Water Meter 5 and stabilizes the Electromagnetic Water Meter 5. A sectional view of the invention is made thru AA, and shown in FIG. 2.

Figure 5:
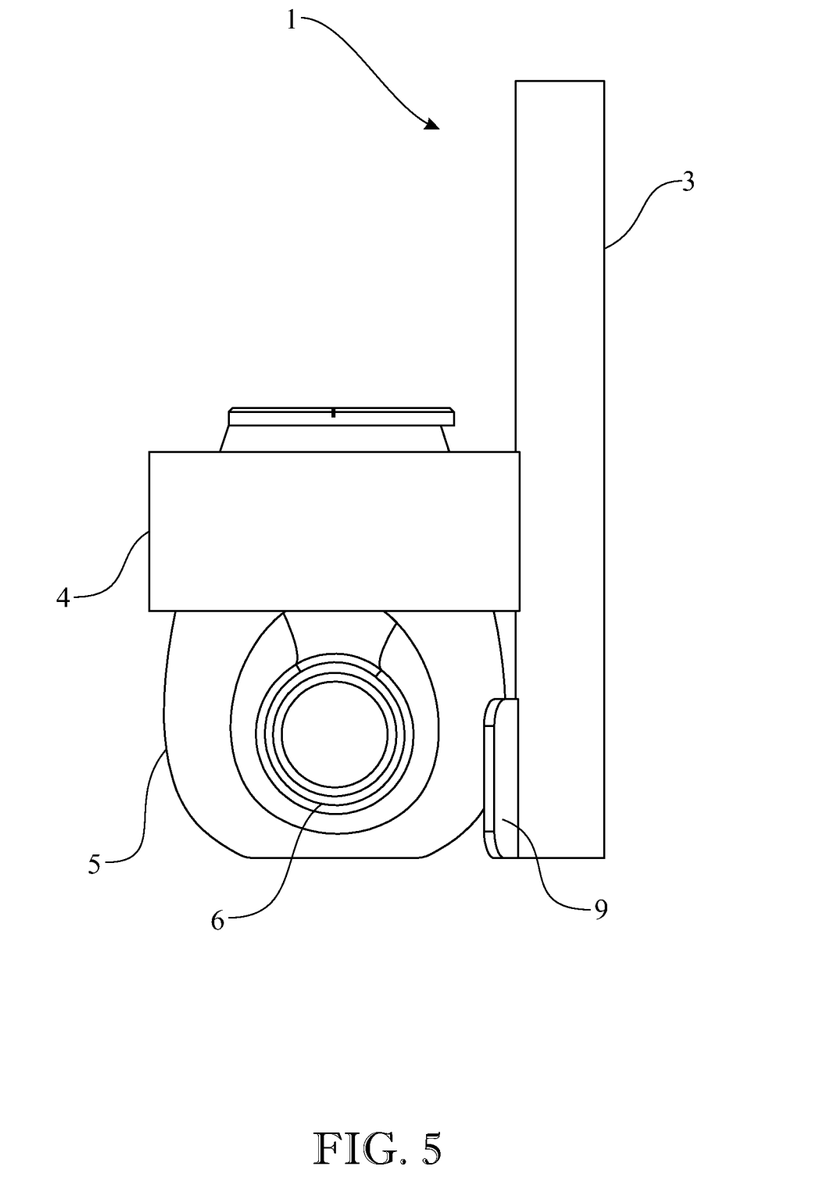
FIG. 5 is a side view of the Electromagnetic Water Meter with the Electromagnetic Water Meter Holder.
Figure 6:
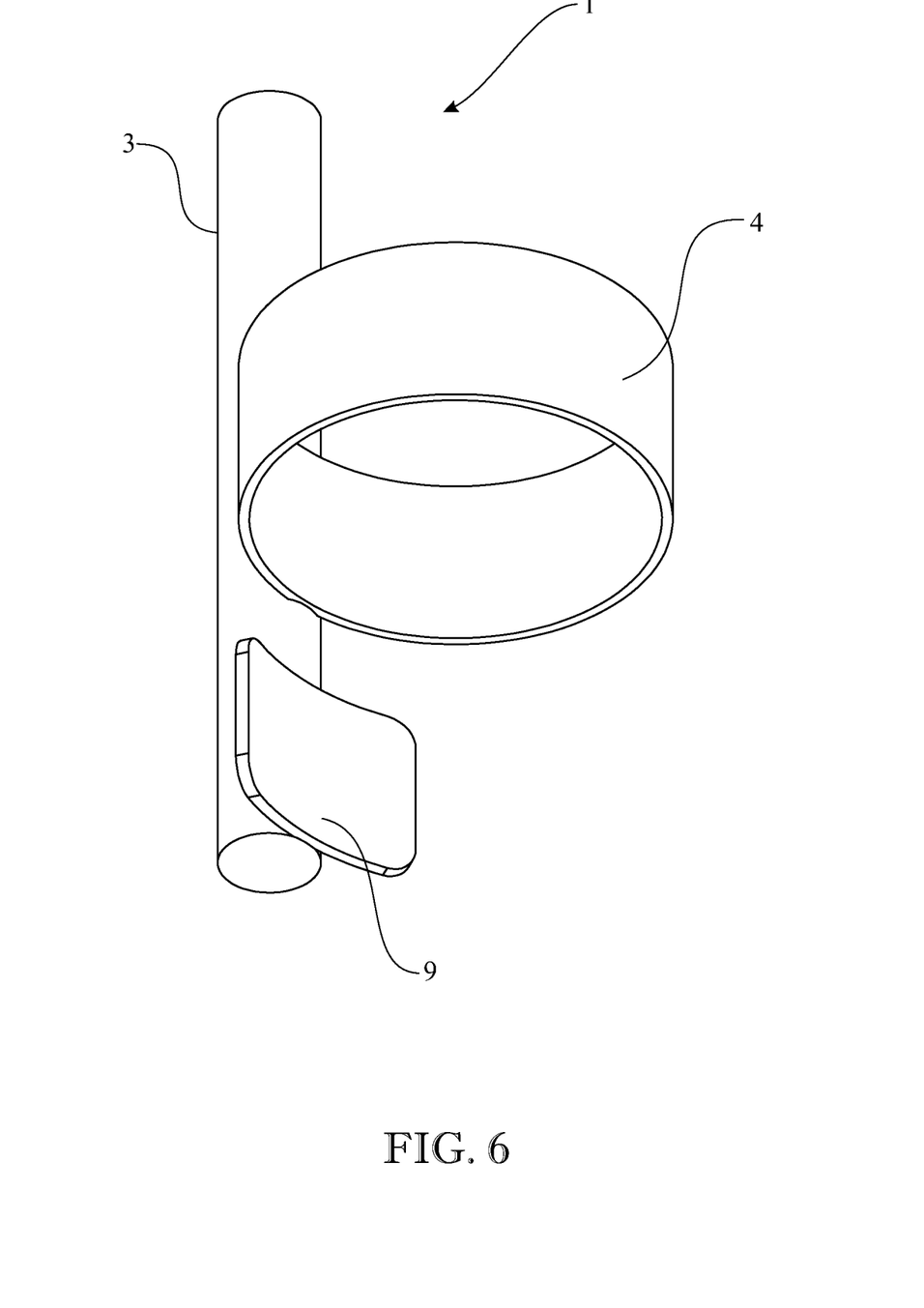
FIG. 6 is an isometric view of the Electromagnetic Water Meter Holder, illustrating the components for use in stabilizing an Electromagnetic Water Meter.

In installation, the Electromagnetic Water Meter 5 connects into the box 2 by screwing the connectors 7 of the existing pipes 8 (see FIG. 1 and FIG. 2) onto the Electromagnetic Water Meter Pipe Nozzles 6. The Electromagnetic Water Meter Holder apparatus 1 includes a cylindrical rod 3 having a large circular tube 4 mounted on the lower portion of it, and an arched tab 9 mounted below the large circular tube 4 (see FIG. 3, FIG. 5 and FIG. 6). As shown in FIG. 1, the Electromagnetic Water Meter Holder apparatus 1 is placed onto the Electromagnetic Water Meter 5 in the water meter box 2 via the cylindrical rod 3, with the large circular tube 4 of the Electromagnetic Water Meter Holder apparatus 1 being placed over the top of and around the Electromagnetic Water Meter 5. The arched tab 9 (as shown in FIGS. 3, 5 and 6) located on the lower portion of the Electromagnetic Water Meter Holder apparatus 1 below the large circular tube 4 is positioned around the surface of the Electromagnetic Water Meter 5 by moving the cylindrical rod 3. The large circular tube 4 and the arched tab 9 both work to secure the Electromagnetic Water Meter 5 in place, and prevent it from rotating, thereby allowing for the Electromagnetic Water Meter 5 to be connected into the box 2 by screwing the connectors 7 of the existing pipes 8 (see FIG. 1 and FIG. 2) onto the Electromagnetic Water Meter Pipe Nozzles 6.

The Electromagnetic Water Meter Holder apparatus 1 is preferably sized to hold and stabilize an Electromagnetic Water Meter 5 in a water meter box 2 of 11 inches by 18 inches in dimension or to hold and stabilize an Electromagnetic Water Meter 5 in a water meter box 2 of 13 inches by 18 inches in dimension, although the Electromagnetic Water Meter Holder apparatus 1 can manufactured for use with different sized water meter boxes 2, and different sized Electromagnetic Water Meters 5, as is known in the art. The Electromagnetic Water Meter Holder apparatus 1 of the present invention is preferably sized to hold and stabilize a Sensus Iperl© Electromagnetic Water Meter 5, but can also be used to hold and stabilize a Neptune© Water Meter, a Badger© Water Meter, a Precision© Water Meter, or any other underground water meter known and used in the art.

Figure 2:
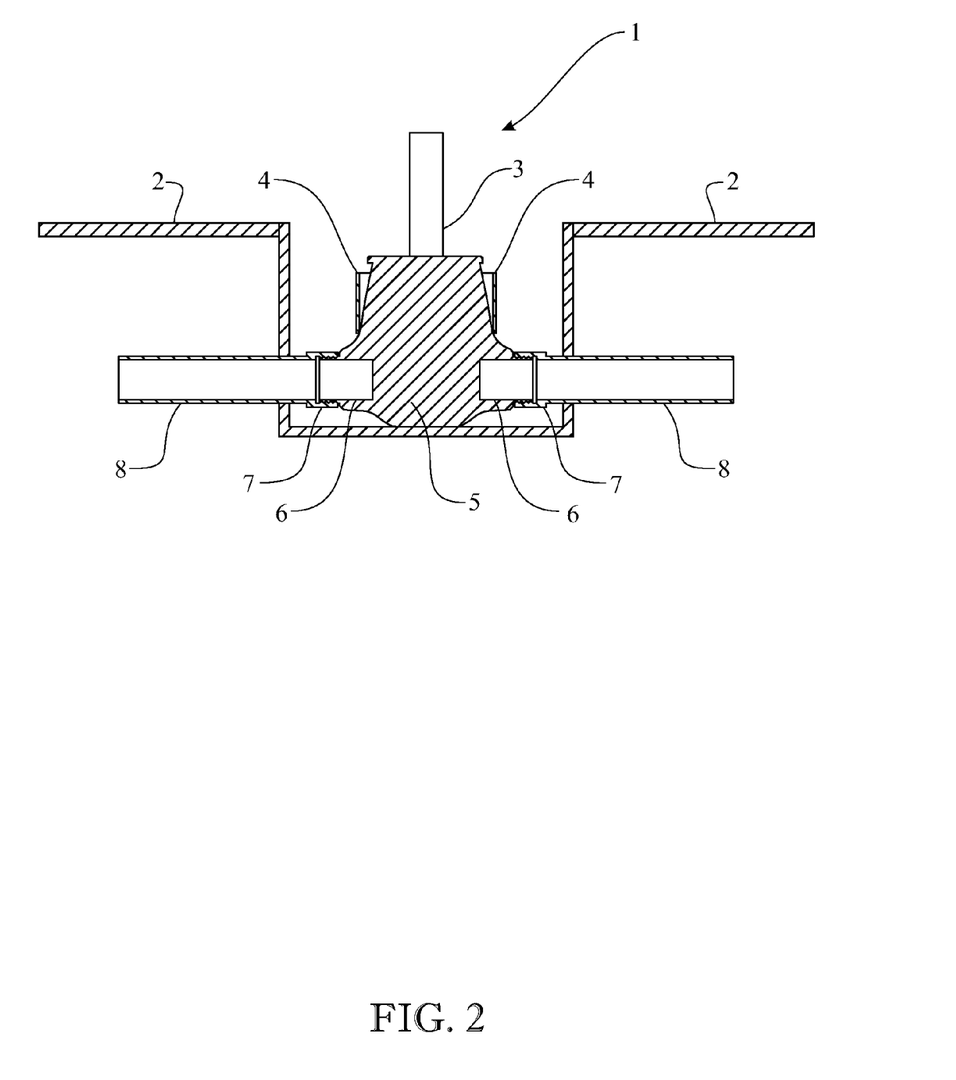
FIG. 2 is a section view of the installed Electromagnetic Water Meter in the water meter box.
Figure 3:
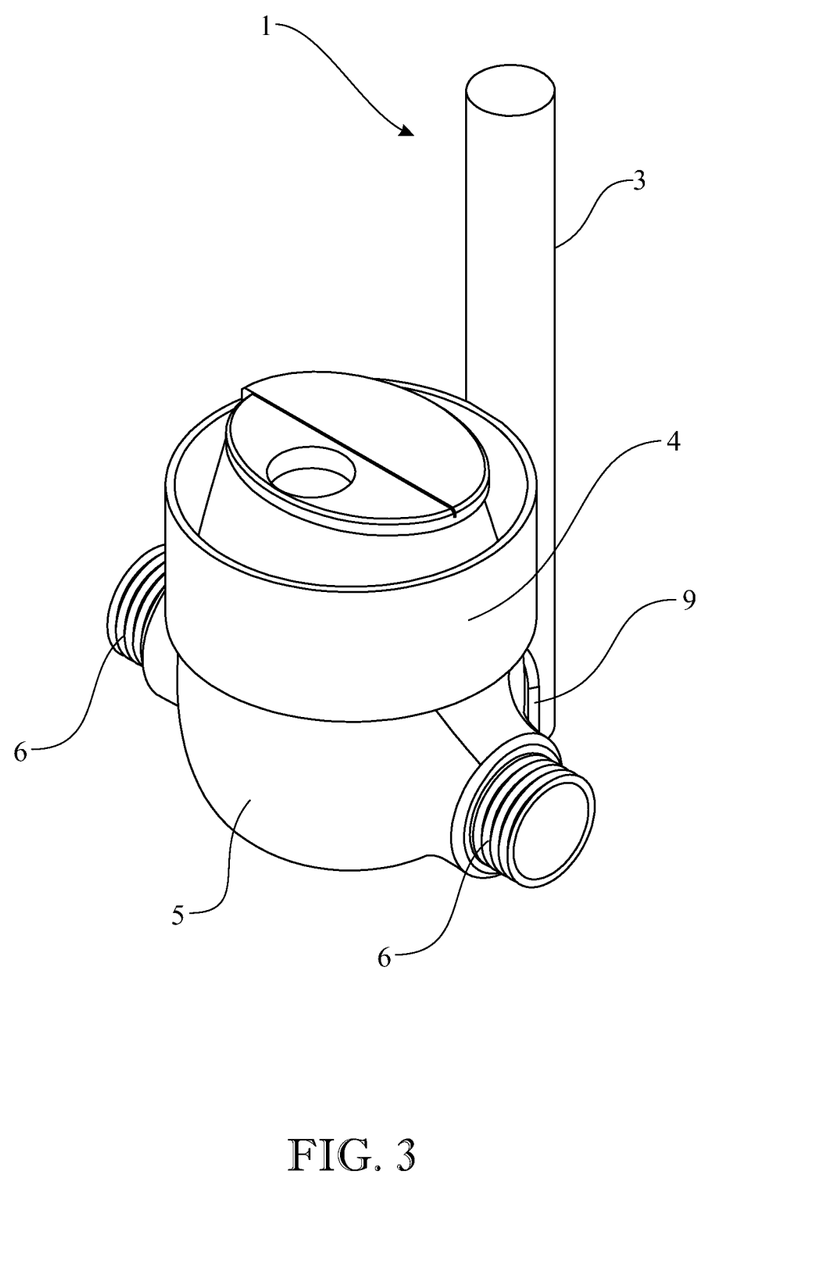
FIG. 3 is an isometric view of the Electromagnetic Water Meter with the Electromagnetic Water Meter Holder.

Referring briefly to FIG. 2, the installed Electromagnetic Water Meter 5 in the water meter box 2 is shown, with an Electromagnetic Water Meter Holder apparatus 1 placed on top of and around the Electromagnetic Water Meter 5. The Electromagnetic Water Meter Holder apparatus 1 is a simple tool with no moving parts, and it slips over the Electromagnetic Water Meter 5 and stabilizes the Electromagnetic Water Meter 5 for installation in the water meter box 2.

In installation, the Electromagnetic Water Meter 5 connects into the box 2 by screwing the connectors 7 of the existing pipes 8 onto the Electromagnetic Water Meter Pipe Nozzles 6. For stabilization of the Electromagnetic Water Meter 5 during installation, the Electromagnetic Water Meter Holder apparatus 1 is used. The Electromagnetic Water Meter Holder apparatus 1 includes a cylindrical rod 3 having a large circular tube 4 mounted on the lower portion of it, and an arched tab 9 mounted below the large circular tube 4 (see FIG. 3, FIG. 5 and FIG. 6). As shown in FIG. 2, the Electromagnetic Water Meter Holder apparatus 1 is placed onto the Electromagnetic Water Meter 5 in the water meter box 2 via the cylindrical rod 3, with the large circular tube 4 of the Electromagnetic Water Meter Holder apparatus 1 being placed over the top of and around the Electromagnetic Water Meter 5. The arched tab 9 (as shown in FIGS. 3, 5 and 6) of the Water Meter Holder Apparatus 1 located on the lower portion of the Water Meter Holder apparatus 1 below the large circular tube 4 is positioned around the surface of the Electromagnetic Water Meter 5 by moving the cylindrical rod 3. The large circular tube 4 and the arched tab 9 both work to secure the Electromagnetic Water Meter 5 in place, and prevent it from rotating, thereby allowing for the Electromagnetic Water Meter 5 to be connected into the box 2 by screwing the connectors 7 of the existing pipes 8 onto the Electromagnetic Water Meter Pipe Nozzles 6.

Referring briefly to FIG. 3, the Electromagnetic Water Meter 5 with the Electromagnetic Water Meter Holder apparatus 1 placed on top of and around the Electromagnetic Water Meter 5 is shown.

The Electromagnetic Water Meter Holder apparatus 1 includes a cylindrical rod 3 having a large circular tube 4 mounted on the lower portion of it, and an arched tab 9 mounted below the large circular tube 4. The Electromagnetic Water Meter Holder apparatus 1 is placed onto the Electromagnetic Water Meter 5 via the cylindrical rod 3, with the large circular tube 4 of the Electromagnetic Water Meter Holder apparatus 1 being placed over the top of and around the Electromagnetic Water Meter 5. The arched tab 9 located on the lower portion of the cylindrical rod 3 of Electromagnetic Water Meter Holder apparatus 1 below the large circular tube 4 is positioned around the surface of the Electromagnetic Water Meter 5 by moving the cylindrical rod 3. The large circular tube 4 and the arched tab 9 both work to secure the Electromagnetic Water Meter 5 in place, and prevent it from rotating, thereby allowing for the Electromagnetic Water Meter 5 to be connected into a box 2 (as shown in FIG. 1) by screwing the connectors 7 of the existing pipes 8 (as shown in FIGS. 1 and 2) onto the Electromagnetic Water Meter Pipe Nozzles 6.

Figure 4:
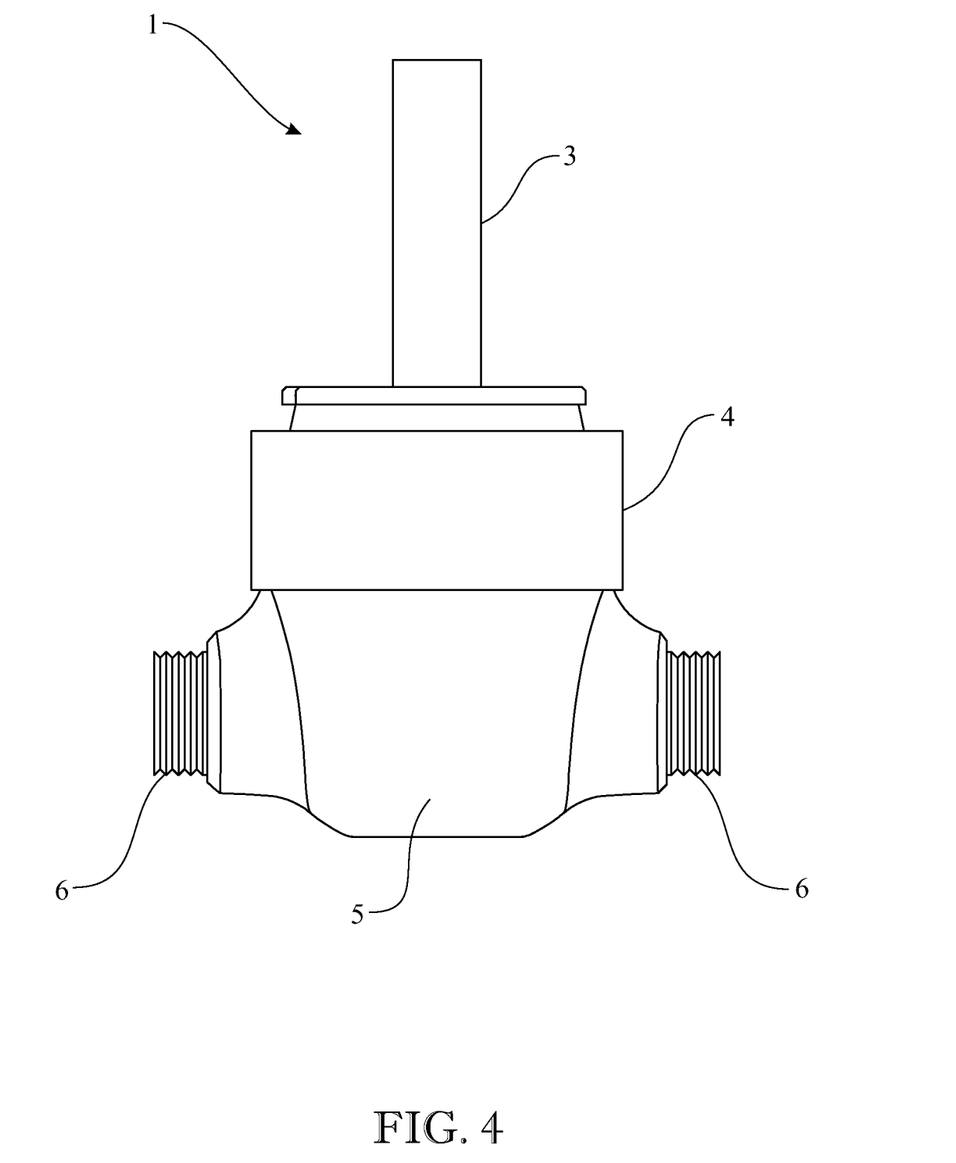
FIG. 4 is a front view of the Electromagnetic Water Meter with the Electromagnetic Water Meter Holder.

Referring briefly to FIG. 4, an Electromagnetic Water Meter 5 with the Electromagnetic Water Meter Holder 1 placed on top of and around the Electromagnetic Water Meter 5 is shown.

The Electromagnetic Water Meter Holder apparatus 1 includes a cylindrical rod 3 having a large circular tube 4 mounted on the lower portion of it, and an arched tab 9 mounted below the large circular tube 4 (as shown in FIGS. 3, 5 and 6). The Electromagnetic Water Meter Holder apparatus 1 is placed onto the Electromagnetic Water Meter 5 via the cylindrical rod 3, with the large circular tube 4 of the Electromagnetic Water Meter Holder apparatus 1 being placed over the top of and around the Electromagnetic Water Meter 5. The arched tab 9 located on the lower portion of the cylindrical rod 3 of Electromagnetic Water Meter Holder apparatus 1 below the large circular tube 4 (as shown in FIGS. 3, 5 and 6) is positioned around the surface of the Electromagnetic Water Meter 5 by moving the cylindrical rod 3. The large circular tube 4 and the arched tab 9 (as shown in FIGS. 3, 5 and 6) of the Electromagnetic Water Meter Holder apparatus 1 both work to secure the Electromagnetic Water Meter 5 in place, and prevent it from rotating, thereby allowing for the Electromagnetic Water Meter 5 to be connected into the water meter box 2 (as shown in FIG. 1) by screwing the connectors 7 of the existing pipes 8 (as shown in FIGS. 1 and 2) onto the Electromagnetic Water Meter Pipe Nozzles 6.

Referring briefly to FIG. 5, an Electromagnetic Water Meter 5 with the Electromagnetic Water Meter Holder apparatus 1 being placed on top of and around the Electromagnetic Water Meter 5 is shown.

The Electromagnetic Water Meter Holder apparatus 1 includes a cylindrical rod 3 having a large circular tube 4 mounted on the lower portion of it, and an arched tab 9 mounted below the large circular tube 4. The Electromagnetic Water Meter Holder apparatus 1 is placed onto the Electromagnetic Water Meter 5 via the cylindrical rod 3, with the large circular tube 4 of the Electromagnetic Water Meter Holder apparatus 1 being placed over the top of and around the Electromagnetic Water Meter 5. The arched tab 9 located on the lower portion of the cylindrical rod 3 of Electromagnetic Water Meter Holder apparatus 1 below the large circular tube 4 is positioned around the surface of the Electromagnetic Water Meter 5 by moving the cylindrical rod 3. The large circular tube 4 and the arched tab 9 of the Electromagnetic Water Meter Holder apparatus 1 both work to secure the Electromagnetic Water Meter 5 in place, and prevent it from rotating in the water meter box (as shown in FIG. 1), thereby allowing for the Electromagnetic Water Meter 5 to be connected into the water meter box 2 (as shown in FIG. 1) by screwing the connectors 7 of the existing pipes 8 (as shown in FIGS. 1 and 2) onto the Electromagnetic Water Meter Pipe Nozzles 6 (as shown in FIGS. 1-5).

Referring briefly to FIG. 6, the Electromagnetic Water Meter Holder apparatus 1 is shown, illustrating the components for use in stabilizing an Electromagnetic Water Meter 5 (as shown in FIG. 1).

The Electromagnetic Water Meter Holder apparatus 1 includes a cylindrical rod 3 having a large circular tube 4 mounted on the lower portion of it, and an arched tab 9 mounted below the large circular tube 4. The cylindrical rod 3, large circular tube 4 and arched tab 9 are preferably made of steel, although any other materials known in the art for use of a similar purpose can be utilized. The large circular tube 5 is preferably mounted to the cylindrical rod 3 by steel rivets, although other mounting means known in the art may also be utilized. The arched tab 9 is preferably mounted to the cylindrical rod 3 by welding, but other mounting means known in the art may also be utilized.

The Electromagnetic Water Meter Holder apparatus 1 is placed onto an Electromagnetic Water Meter 5 via the cylindrical rod 3, with the large circular tube 4 of the Electromagnetic Water Meter Holder apparatus 1 being placed over the top of and around the Electromagnetic Water Meter 5 (as shown in FIGS. 1 and 3). The arched tab 9 located on the lower portion of the cylindrical rod 3 of Electromagnetic Water Meter Holder apparatus 1 below the large circular tube 4 is positioned around the surface of the Electromagnetic Water Meter 5 by moving the cylindrical rod 3 (as shown in FIGS. 1 and 3). The large circular tube 4 and the arched tab 9 both work to secure the Electromagnetic Water Meter 5 in place, and prevent it from rotating in the water meter box 2 (as shown in FIG. 1), thereby allowing for the Electromagnetic Water Meter 5 to be connected into the water meter box 2 (as shown in FIG. 1) by screwing the connectors 7 of the existing pipes 8 (as shown in FIGS. 1 and 2) onto the Electromagnetic Water Meter Pipe Nozzles 6 (as shown in FIGS. 1-5).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An electromagnetic water meter holder apparatus for holding and stabilizing an electromagnetic water meter in a water meter box for installation or removal, comprising:
   a cylindrical rod having a top end, a center and a bottom end; and
   a large circular tube mounted on said cylindrical rod between said center and said bottom end; and
   an arched tab mounted on said cylindrical rod between said large circular tube and said bottom end.

2. An electromagnetic water meter holder apparatus as recited in claim 1, wherein said cylindrical rod is steel.

3. An electromagnetic water meter holder apparatus as recited in claim 1, where said large circular tube is steel.

4. An electromagnetic water meter holder apparatus as recited in claim 1, wherein said arched tab is steel.

5. An electromagnetic water meter holder apparatus as recited in claim 1, where said large circular tube is mounted on said cylindrical rod by steel rivets.

6. An electromagnetic water meter holder apparatus as recited in claim 1, where said arched tab is mounted on said cylindrical rod by welding.

7. An electromagnetic water meter holder apparatus as recited in claim 1, wherein said electromagnetic water meter holder apparatus is sized to hold and stabilize an electromagnetic water meter in a water meter box of 11 inches by 18 inches in dimension.

8. An electromagnetic water meter holder apparatus as recited in claim 1, wherein said electromagnetic water meter holder apparatus is sized to hold and stabilize an electromagnetic water meter in a water meter box of 13 inches by 18 inches in dimension.

9. An electromagnetic water meter holder method comprising:
- positioning an electromagnetic water meter having electromagnetic water meter pipe nozzles into a water meter box for installation; and
- aligning the electromagnetic water meter pipe nozzles of the electromagnetic water meter up with existing pipe for water flow in and water flow out of the water meter box; and
- positioning an electromagnetic water meter holder apparatus onto and around the electromagnetic water meter, the electromagnetic water meter holder apparatus having a cylindrical rod having a top end, a center and a bottom end; and a large circular tube mounted on the cylindrical rod between the center and the bottom end; and an arched tab mounted on the cylindrical rod between the large circular tube and the bottom end;
- optimizing said positioning of the electromagnetic water meter holder apparatus and thereby the holding and securing of the electromagnetic water meter in place by moving the cylindrical rod of the electromagnetic water meter holder apparatus, thereby moving the large circular tube on top of and around the electromagnetic water meter and the arched tab around the electromagnetic water meter to prevent rotation or movement of the electromagnetic water meter; and
- connecting the existing pipe for water flow in and water flow out of the water meter box to the electromagnetic water meter by securing the existing pipe to the electromagnetic water meter pipe nozzles with connectors, while continuing to optimally position the water meter holder apparatus by moving the cylindrical rod.

10. An electromagnetic water meter holder method as recited in claim 9, wherein the cylindrical rod is steel.

11. An electromagnetic water meter holder method as recited in claim 9, wherein the cylindrical rod is steel.

12. An electromagnetic water meter holder method as recited in claim 9, where the large circular tube is steel.

13. An electromagnetic water meter holder method as recited in claim 9, wherein the arched tab is steel.

14. An electromagnetic water meter holder method as recited in claim 9, where the large circular tube is mounted on the cylindrical rod by steel rivets.

15. An electromagnetic water meter holder method as recited in claim 9, where the arched tab is mounted on the cylindrical rod by welding.

16. An electromagnetic water meter holder method as recited in claim 9, wherein the electromagnetic water meter holder is sized to hold and stabilize an electromagnetic water meter in a water meter box of 11 inches by 18 inches in dimension.

17. An electromagnetic water meter holder method as recited in claim 9, wherein the electromagnetic water meter holder is sized to hold and stabilize an electromagnetic water meter in a water meter box of 13 inches by 18 inches in dimension.

18. An electromagnetic water meter holder method comprising:
- opening a water meter box for the removal of an electromagnetic water meter, the electromagnetic water meter having electromagnetic water meter pipe nozzles connected to existing pipe via connectors for water flow in and water flow out of the water meter box; and
- positioning an electromagnetic water meter holder apparatus onto and around the electromagnetic water meter, the electromagnetic water meter holder apparatus having a cylindrical rod having a top end, a center and a bottom end; and a large circular tube mounted on the cylindrical rod between the center and the bottom end; and an arched tab mounted on the cylindrical rod between the large circular tube and the bottom end; and
- optimizing said positioning of the electromagnetic water meter holder apparatus and thereby the holding and securing of the electromagnetic water meter in place by moving the cylindrical rod of the electromagnetic water meter holder apparatus, thereby moving the large circular tube on top of and around the electromagnetic water meter and the arched tab around the electromagnetic water meter to prevent rotation or movement of the electromagnetic water meter; and
- disconnecting the existing pipe for water flow in and water flow out of the water meter box to the electromagnetic water meter by removing the connectors from the existing pipe to the electromagnetic water meter pipe nozzles of the electromagnetic water meter, while continuing to optimally position the water meter holder apparatus by moving the cylindrical rod.

* * * * *